United States Patent [19]

Foerst

[11] Patent Number: 4,582,490

[45] Date of Patent: Apr. 15, 1986

[54] SWIVEL STAND FOR DRIVING SIMULATOR

[75] Inventor: Reiner Foerst, Gummersbach, Fed. Rep. of Germany

[73] Assignee: Dr. Reiner Foerst GmbH, Marienheide, Fed. Rep. of Germany

[21] Appl. No.: 689,879

[22] Filed: Jan. 9, 1985

[51] Int. Cl.⁴ ............................................. G09B 9/04
[52] U.S. Cl. ................................................... 434/62
[58] Field of Search ...................... 434/61, 62, 63, 64, 434/65, 66, 67, 68, 69, 70, 71, 29

[56] References Cited

U.S. PATENT DOCUMENTS 3,686,776  8/1972  Dahl ...................... 434/61

4,276,030  6/1981  Radice ................... 434/62

FOREIGN PATENT DOCUMENTS 3032250  4/1982  Fed. Rep. of Germany ........ 434/69

Primary Examiner—Harland S. Skogquist
Attorney, Agent, or Firm—Becker & Becker, Inc.

[57] ABSTRACT

A swivel stand for amusement games that includes a swiveling body which is turnable and mounted in bearings in a frame with a small air gap between two footboards and drivable by a gear motor and on which a car seat, a motorcycle seat, a bike seat or vehicle seat with control elements of a driving simulator belonging therewith can be mounted.

6 Claims, 1 Drawing Figure

SWIVEL STAND FOR DRIVING SIMULATOR

BACKGROUND OF THE INVENTION

1. Field of the Invention

The present invention relates to a swivel stand that includes a swiveling body which is turnable and mounted in bearings in a frame with a small air gap between two footboards and drivable by a gear motor. A car, motor cycle, bike or vehicle seat with pertaining control elements of a driving simulator can be mounted on the swivel stand.

2. Description of the Prior Art

A similar arrangement or device is known from the West German Patent Application No. 30 32 250 AI, of Aug. 27, 1980 (Foerst) published Apr. 1, 1982 entitled as a driving simulator or "Fahrtsimulator" in German. A driving simulator is described which is swivelable around an horizontal axis for the simulation of centrifugal forces at the time of or during travel in a curve while driving. The control of the swivel motor by the signal for the centrifugal acceleration is described in this West German disclosure. This device is different, however, from the subject matter of the present disclosure in that the picture screen is also turned. In this manner, centrifugal forces but not sloping positions are simulated. Should the swivel mechanism be used for the foregoing task, a disadvantage would arise that a movement in horizontal direction in the foot area would occur according to the high-positioned swivel axis, via which accidents might happen or be encountered when mounting and dismounting.

Another simulator device is known from the U.S. Pat. No. 3,686,776-Dahl dated Aug. 29, 1972 and entitled "Motorcylce Riding Simulator". There is described herewith a mechanical construction for balance exercise of motorcycle drivers. Two convex rolls are driven by the rear wheel of a real or actual motorcycle. This device differs from the subject matter of the present disclosure in that it is not used for a driving simulator with picture screen but for a real or actual motorcycle and that no gear motor for the control of the sloping position is provided therewith. Rather, the sloping position is reached directly by the handle bar movement in connection with or relative to the rotation of the real or actual wheel. Furthermore, this device has the disadvantage, that accidents may occur by the rotation of the two wheels and the two rolls at the time of or during mounting and dismounting.

The above mentioned prior art disclosures have the disadvantage in that they lack any disclosure as to how to keep the distances small between the movable parts for enhancing safety aspects therewith. In fact, a high positioned swivel axis creates the disadvantage that the cabin is movable in horizontal direction in the foot area.

SUMMARY OF THE INVENTION

Therefore, an object of the present invention is to create a device for the lateral swiveling of a car seat, a motorcycle seat, a bike seat or vehicle seat as well as including seats which are to be used for amusement games and therefore have to be inexpensive and safe.

This object is resolved or fulfilled by a device having features according to the present invention, and compared to the state of the art, having the following advantages:

(1) - the device is to be simple and economical;

(2) - the device is to be controllable by electronic circuitry of a driving simulator in any way; and (3) - the device is to meet the regulations for the prevention of accidents, since the air gap may be implemented so small or narrow that not even a small finger can be jammed therein.

BRIEF DESCRIPTION OF THE DRAWINGS

This object, and other objects and advantages of the present invention, will appear more clearly from the following specification in conjunction with the accompanying drawing, in which.

DETAILED DESCRIPTION

Figure 1:
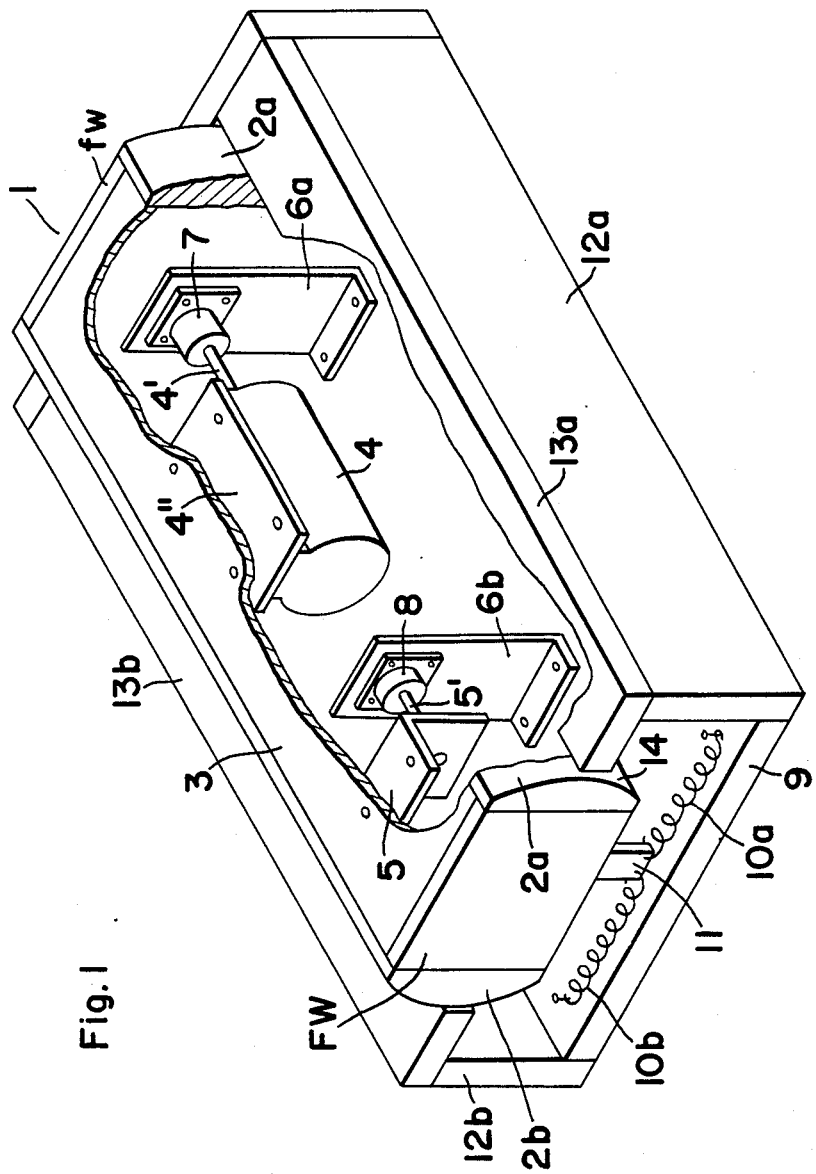
FIG. 1 shows a perspective view of a device, partially broken away, having features in accordance with the present invention.

Referring now to the drawing in detail, FIG. 1 shows a device or an arrangement including swiveling body 1, comprising two cylinder-like or semi-arcuate plate-shaped side walls 2a and 2b as well as a main mounting plate 3. A car or vehicle seat with steering wheel, pedals and gear shift lever is mountable thereon; also, a motorcycle seat with handle bars, accelerator grip, foot gear lever and foot brake lever is mountable thereon; and similarly, a bicycle seat with pedals can be mounted thereon.

As shown in FIG. 1, the device or arrangement further includes a gear motor 4 and an angle member 5 with a shaft 5' journalled to one side thereof. The motor 4 and the angle member 5 are fastened to the mounting plate 3 by non-illustrated screws or mounting bolts from below. A first upright stand 6a with a bearing unit 7 thereon for journalling a shaft 4' of the gear motor 4 and a second upright stand 6b with a bearing unit 8 thereon for journalling the shaft 5' to one side of the angle member 5 are mounted onto a bottom plate 9. Two or more springs 10a, 10b are fastened at the external ends or outer extremities thereof to the bottom plate 9 by pins or fasteners; the inner ends of the springs 10a, 10b are fastened centrally at a side or laterally relative to lever arm means 11 of the swiveling body 1, two sidewalls 12a and 12b and two foot panels or base boards 13a and 13b between which the swiveling body 1 is movable with respect to an air gap 14 therebetween. The shaft 4' and the shaft 5' define an horizontal axis collectively and coaxially relative to each other with respect to the upright stands 6a and 6b.

Not shown in FIG. 1 are the front wall, the seat with the control elements of the driving simulator which is to be mounted on the mounting plate 3 and the housing with the monitor screen and the electronic circuitry of the simulator which is to be put not movable or immovably mounted in front of the swivel stand.

In the case of a car or vehicle simulation, provision is made that the gear motor 4 is controlled by a signal representative for the road curvature of the driving simulator in order to preset the sloping position at a racing course with steep slope curves.

In the case of a motorcycle simulation, provision is made that the gear motor 4 is controlled by a signal representative for the sloping position or by a signal representative for the centrifugal force of the simulator in order to preset the sloping position.

A device or arrangement having features according to the present invention for the swiveling of an amusement driving simulator is usable with a picture screen standing solidly on the floor. The device includes a body capable of swivelling movement that is drivable around the horizontal axis by operation of the gear motor 4 into a sloping position and with which a seat and the control elements of a vehicle can be mounted relative thereto; the device or arrangement of the present invention can include the following features:

(a) two cylinder-like or semi-arcuate plate-shaped side walls 2a, 2b and lever arm means 11 extending downwardly from the main mounting plate 3 of the swiveling body 1;

(b) an angle member 5 with a shaft 5' and the gear motor 4 having a mounting plate 4" such that the angle member 5 and motor-mounting plate 4" are screwed under the main mounting plate 3;

(c) a first upright stand 6a with a bearing unit 7 for journalling the shaft 4' of the gear motor 4 and a second upright stand 6b with a bearing unit 8 for journalling the shaft 5' of the angle member 5, which stands 6a and 6b are mounted on the bottom plate 9;

(d) two or more springs 10a and 10b are provided as fastened with one end of each thereof secured to the bottom plate 9 and with the other end of each thereof secured to the lever arm means 11;

(e) two foot panels or base boards 13a and 13b as well as two side walls 12a and 12b are arranged extending in substantially parallel spaced relationship respectively, between which the side walls 2a and 2b of the swivelling body 1 are movable with an air gap 14 narrowly therewith; and (f) two frontwalls fw and FW are provided transversely at opposite ends of the swivelling body 1.

The present invention is, of course, in no way restricted to the specific disclosure of the specification and drawing, but also encompasses any modifications within the scope of the appended claims.

What I claim is:

1. A device for swiveling of an amusement driving simulator with which a picture screen standing solidly on a floor is used and with which a swivelable body is drivable around an horizontal axis by a gear motor into a sloping position and with which a seat and the control elements of a vehicle can be mounted, comprising:

a pair of semi-arcuate plate-shaped side walls and a main mounting plate interconnected with said pair of semi-arcuate plate-shaped side walls of the swiveling body;

an angle member secured to said main mounting plate and a shaft extending to one side thereof;

a motor mounting plate secured to said main mounting plate and a gear motor carried by said motor mounting plate;

said angle member and said motor mounting plate having a location under said main mounting plate;

a first stand and a first bearing unit provided therewith;

a shaft of said gear motor journalled at one end thereof;

a second stand and a second bearing unit provided therewith;

an angle member and a shaft journalled by said second bearing unit;

a bottom plate and a pair of outer side walls connected thereto;

said second stand being mounted on said bottom plate;

a lever arm means extending downwardly in a location intermediate said pair of semi-arcuate plate-shaped side walls;

two spring means fastened with one end of each thereof to said bottom plate and with the other end of each thereof to said lever arm means; and two foot boards connected in spaced apart location as joined to said two outer side walls, between which said pair of semi-arcuate plate-shaped side walls of said swiveling body are movable with respect to an air gap located laterally between said foot boards.

2. A device according to claim 1, including opposite frong walls interconnecting said pair of semi-arcuate plate-shated side walls.

3. A device according to claim 2, in which said lever arm means extends downwardly from one of said opposite front walls.

4. A device according to claim 3, in which said shaft of said gear motor and said shaft journalled by said second bearing unit define an horizontal axis and extend in axially spaced relationship to each other.

5. A device according to claim 4, in which said angle member and said motor mounting plate each secured to said main mounting plate have positions in longitudinal alignment in location intermediate said opposite front walls.

6. A device according to claim 5, in which said swiveling body pivots about the horizontal axis for simulation of centrifugal forces at the time of driving in a curve while concurrently and simultaneously therewith also simulating sloping positions about the horizontal axis although enhancing safety under circumstances when accidents might occur during mounting and dismounting relative to said foot boards, said gear motor being provided for control of sloping position.

* * * * *